United States Patent [19]

Purdy et al.

[11] Patent Number: 4,722,222
[45] Date of Patent: Feb. 2, 1988

[54] SKI SPEEDOMETER

[75] Inventors: Peter K. Purdy; Kirk W. Beach, both of Seattle, Wash.

[73] Assignee: Skisonics Corporation, Kirkland, Wash.

[21] Appl. No.: 911,573

[22] Filed: Sep. 25, 1986

[51] Int. Cl.⁴ ............................................. G01N 29/00
[52] U.S. Cl. ........................................ 73/597; 324/160
[58] Field of Search ................. 73/597, 627, 628, 629; 324/175, 160; 364/565, 821

[56] References Cited

U.S. PATENT DOCUMENTS 3,505,878  4/1970  Moll ...................................... 73/490
3,564,488  2/1971  Higashi et al. ..................... 73/628 X
4,262,537  4/1981  Jander et al. ........................ 73/490
4,546,650  10/1985 Cameron ............................. 73/490

Primary Examiner—Jerry W. Myracle
Attorney, Agent, or Firm—Ward Brown; Robert W. Beach

[57] ABSTRACT

A transducer is mounted on a ski and transmits ultrasonic waves toward the stationary medium over which the ski is moving. The same transducer or a separate transducer detects waves reflected from the stationary medium. A computer calculates the speed of the ski from the Doppler shift of the reflected waves and actuates a readout unit to indicate the speed to the skier.

8 Claims, 3 Drawing Figures

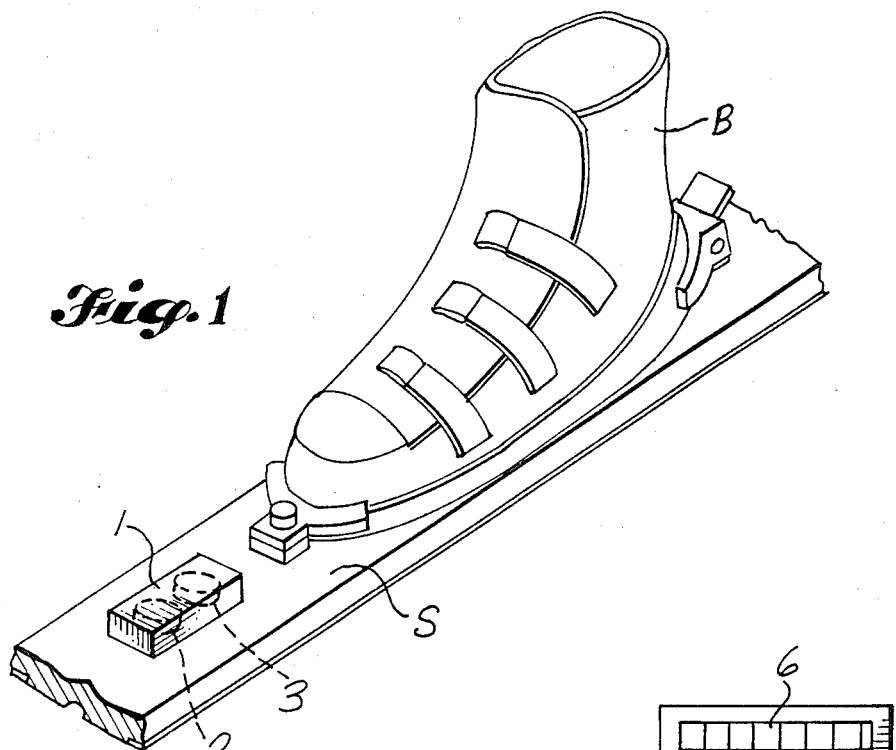
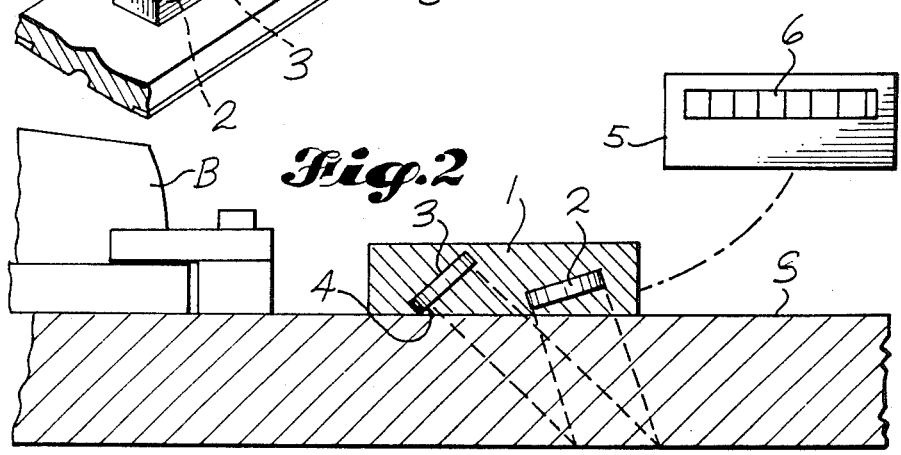
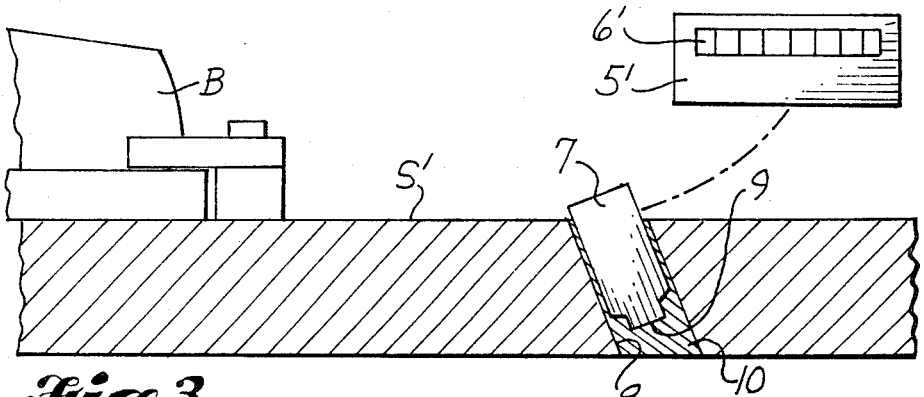

SKI SPEEDOMETER

BACKGROUND OF THE INVENTION

1. Field of the Invention

The present invention relates to speedometers and odometers. More specifically, the present invention relates to a speedometer-odometer for a ski.

2. Prior Art

Moll U.S. Pat. No. 3,505,878 discloses a "Speed and Distance Indicator for a Ski Device". Jander et al. U.S. Pat. No. 4,262,537 discloses a "Speedometer and/or Odometer for Skiers". Cameron U.S. Pat. No. 4,546,650 discloses a "Speed and Distance Calculator for Skis". Each of the devices described in these patents uses one or more wheels mounted on the ski for rotation about a horizontal axis and rotated by contact with the medium over which the ski is traveling, namely, the snow or water.

SUMMARY OF THE INVENTION

The principal object of the present invention is to provide a speedometer-odometer of simple, inexpensive construction, sturdy and reliable in use and adaptable for use on an object moving relative to a stationary medium, particularly adaptable for use on a ski.

In the preferred embodiment of the present invention, the foregoing object is accomplished by mounting wave-transmitting and receiving transducers stationarily relative to the moving object; and by providing mechanism for measuring the difference between the frequency of transmitted waves and waves reflected from the stationary medium and detected by the receiving transducer for calculating the speed of the object relative to the stationary medium in accordance with the Doppler effect. In the preferred embodiment, a computer processes a signal generated by the receiving transducer and can actuate a display of current speed on a readout unit. The computer can have an internal clock and be programmed to calculate information on the distance traveled as well as speed information.

BRIEF DESCRIPTION OF THE DRAWINGS

FIG. 1 is a very diagrammatic, fragmentary, top perspective of a snow ski having components of the ski speedometer in accordance with the present invention.

FIG. 2 is an enlarged diagrammatic side elevation of a portion of the ski of FIG. 1, with parts shown in section.

FIG. 3 is a diagrammatic side elevation corresponding to FIG. 2 illustrating an alternative embodiment of a ski speedometer in accordance with the present invention.

DETAILED DESCRIPTION

In the embodiment shown in FIGS. 1 and 2, the ski speedometer in accordance with the present invention includes a block 1 mounted on the top surface of a snow ski S having the usual bindings for a ski boot B. As best seen in FIG. 2, the block 1 mounts a transducer 2 stationarily relative to the ski S for transmitting ultrasonic waves of a known, preferably constant, frequency downward through the block and also through the ski itself. In the illustrated embodiment, the ultrasound waves are transmitted downward and forward at a small acute angle to vertical.

A receiving transducer 3 is mounted rearward from the transmitting transducer 2 in the block 1. Ultrasonic waves reflected from the medium over which the ski is traveling impinge on the flat bottom face 4 of the receiving transducer 3 which generates a corresponding electrical signal. Preferably, the flat bottom face 4 of the receiving transducer 3 is positioned perpendicular to waves reflected at the bottom of the ski. As illustrated in broken lines in FIG. 2, waves perpendicular to the transducer faces at their opposite side edges intersect, respectively, precisely at the bottom of the ski. In the arrangement shown, the receiving transducer is inclined more sharply than the transmitting transducer.

Given the known angles of the transmitting and receiving transducers 2 and 3 and the known constant frequency of the transmitted ultrasound waves, the speed of the ski relative to the stationary supporting medium can be calculated once the frequency of reflected waves is detected. Preferably, the calculation is performed by a computer 5 having a readout or display 6 and mounted on the ski. Optionally, the computer can be mounted on the ski boot and have a conveniently detachable cable connectible to the transducer block 1. The computer also could be carried by the skier, in which case the readout could be a separate unit mounted, for example, on a wrist band or in the skier's helmet or goggles. The transducers and the detecting-calculating mechanism can be similar to that used in medical Doppler blood flowmeters.

The computer is programmed to calculate the speed of the ski relative to the supporting medium and display it on the readout 6. Preferably the computer has an internal clock so that optionally or additionally distance traveled also can be displayed. The computer can be provided with memory and programmed to display current speed, average speed, maximum speed, current acceleration, maximum acceleration, trip distance, cumulative distance, trip time, total or cumulative time, air time (i.e., the time for which the ski bottom was not in contact with the supporting medium) or time of day.

In the alternative embodiment shown in FIG. 3, a single transducer 7 is mounted in a cavity 8 in the ski S'. Such transducer is of the "pulsed-Doppler" type, alternatively transmitting ultrasonic waves and receiving reflected waves. Its transmitting-receiving face 9 is angled downward and forward. The bottom portion of the cavity can be filled with a suitable medium 10 for conducting ultrasonic waves such that the form shown in FIG. 3 is particularly adapted to a ski of a type which will not otherwise transmit ultrasonic waves. The computer 5' with readout 6' controls the transducer and performs the calculations as in the previously described embodiment.

We claim:

1. A speedometer for a ski supported over and moving along a stationary medium comprising transducer means mounted for movement with the ski for transmitting waves toward the stationary medium and for detecting such waves reflected from the stationary medium, means for measuring the difference in frequency between the transmitted and reflected waves in accordance with the Doppler effect, and means for calculating and indicating the speed of the ski from such frequency difference.

2. A speedometer for a ski supported on a stationary medium comprising a first transducer mounted stationarily on the ski for transmitting waves downward to the medium, a second transducer mounted stationarily on the ski for detecting transmitted waves reflected from the supporting medium, means for calculating the speed of the ski relative to the supporting medium in accordance with the Doppler effect, and means for indicating such speed.

3. The speedometer defined in claim 2, in which the first transducer directs waves downward and forward at an acute angle to vertical.

4. The speedometer defined in claim 3, in which the second transducer is offset from the first transducer.

5. The speedometer defined in claim 4, in which the second transducer has a receiving face angled relative to the ski at an angle sharper than the angle of transmission of the waves by the first transducer.

6. The speedometer defined in claim 2, in which the transducers are mounted over the top surface of the ski for transmission of ultrasonic waves through the ski.

7. The speedometer defined in claim 2, in which the second transducer has a flat receiving face positioned perpendicular to waves reflected at the bottom of the ski.

8. A speedometer for a ski supported by a stationary medium, said ski having a cavity therein, comprising transducer means mounted in said cavity for transmitting waves generally downward and for detecting transmitted waves reflected from the supporting medium, means for calculating the speed of the ski relative to the supporting medium in accordance with the Doppler effect, and means for indicating such speed.

* * * * *